(12) United States Patent
Morgan et al.

(10) Patent No.: US 11,744,249 B2
(45) Date of Patent: Sep. 5, 2023

(54) DISINFECTANTS WITH IODINE AND COPPER COMPLEXES FOR USE AGAINST CORONAVIRUS

(71) Applicant: CLYRA Medical Technologies, Inc., Westminster, CA (US)

(72) Inventors: Douglas J. Morgan, Reno, NV (US); Steve Harrison, Naples, FL (US); Tanya Rhodes, Largo, FL (US)

(73) Assignee: Clyra Medical Technologies, Inc., Westminster, CA (US)

( * ) Notice: Subject to any disclaimer, the term of this patent is extended or adjusted under 35 U.S.C. 154(b) by 0 days.

(21) Appl. No.: 17/819,439

(22) Filed: Aug. 12, 2022

(65) Prior Publication Data

US 2022/0386621 A1 Dec. 8, 2022

Related U.S. Application Data

(62) Division of application No. 16/874,525, filed on May 14, 2020, now Pat. No. 11,457,632.

(60) Provisional application No. 63/019,922, filed on May 4, 2020.

(51) Int. Cl.
| | |
|---|---|
| *A01N 59/20* | (2006.01) |
| *A01N 25/02* | (2006.01) |
| *A01N 59/12* | (2006.01) |

(52) U.S. Cl.
CPC ............ *A01N 59/20* (2013.01); *A01N 25/02* (2013.01); *A01N 59/12* (2013.01)

(58) Field of Classification Search
None
See application file for complete search history.

(56) References Cited

U.S. PATENT DOCUMENTS

| | | |
|---|---|---|
| 8,642,057 B2 | 2/2014 | Code et al. |
| 8,846,067 B2 | 9/2014 | Code et al. |
| 2008/0145391 A1 | 6/2008 | Nelson et al. |
| 2012/0263801 A1 | 10/2012 | Code et al. |
| 2018/0228837 A1* | 8/2018 | Rhodes .................. A61K 47/10 |

OTHER PUBLICATIONS

Meiers & Schachtele (The effect of an antibacterial solution on the microflora of human incipient fissure caries, J. Dent. Res. 63(1): 47-51, Jan. 1984) (Year: 1984).*

Meiers & Shook (Abstract, Effect of disinfectants on the bond strength of composite to dentin, Am. J. Dent, Feb. 1996. 9(1):11-4) (Year: 1996).*

Borkow, G., et al., "Copper-Impregnated Antimicrobial Textiles; an Innovative Weapon to Fight Infection," *Medical and Healthcare Textiles*, Anand, S.C., et al., eds., pp. 14-22, Woodhead Publishing Limited, United Kingdom (2010).

Cervantes, H., et al., "Antimicrobial Activity of Copper Against Organisms in Aqueous Solution: A Case for Copper-based Water Pipelines in Hospitals?," *American Journal of Infection Control*, 41(12): E115-E118, Elsevier, Netherlands (2013).

Chen, M.X., et al., "Formulation and Evaluation of Antibacterial Creams and Gels Containing Metal Ions for Topical Application," *Journal of Pharmaceutics*, 2016(5754349), 10 pages, Hindawi Publishing Corporation, United Kingdom (2016).

Cooper, R.A., "Iodine Revisited," International Wound Journal, 4(2): 124-137, Blackwell Publishing Ltd. and Medicalhelplines.com Inc., Y 2007.

Ferguson et al., "Comparison of 5% Povidone-iodine Solution Against 1% Povidone-iodine Solution Preoperative Cataract Surgery Antisepsis: a prospective randomized double blind study," British Journal of Ophthalmology, 87: 163-167, BMJ Publishing Group Ltd., United Kingdom (2003).

Fujimori, Y., et al., "Novel Antiviral Characteristics of Nanosized Copper(I) Iodide Particles Showing Inactivation Activity against 2009 Pandemic H1N1 Influenza Virus," Applied and Environmental Microbiology, 78(4): 951-955, American Society for Microbiology, United States (2011).

Garcia, C.F., et al., "Metal Ions Weaken the Hydrophobicity and Antibiotic Resistance of *Bacillus subtilis* NCIB 3610 Biofilms," NPJ Biofilms and Microbiomes, 6(1): pp. 1-11, Springer Nature Limited, United Kingdom (2020).

Hirsch, T., et al., "Evaluation of Toxic Side Effects of Clinically Used Skin Antiseptics In Vitro," Journal of Surgical Research, 164(2): p. 344-350, Elsevier, Netherlands (2010).

Meiers & Schachtele, (The effect of an antibacterial solution on the microflora of human incipient fissure caries) J. Dent. Res. 63(1): 47-51, Jan. 1984) (1984).

Meiers & Shook, (Abstract, Effect of disinfectants on the bond strength of composite to dentin) Am. J. Dent, Feb. 1996. 9(1):11-4) (1996).

Van Den Broek, P.J., et al., "Interaction of Povidone-Iodine Compounds, Phagocytic Cells and Microorganisms," Antimicrobial Agents and Chemotherapy, 22(40): 593-597, American Society for Microbiology, United States (1982).

(Continued)

*Primary Examiner* — H. Sarah Park
(74) *Attorney, Agent, or Firm* — STERNE, KESSLER, GOLDSTEIN & FOX P.L.L.C.

(57) ABSTRACT

Liquid antimicrobial disinfectant compositions for treatment of coronaviruses and specifically the Covid-19 virus (SARS-CoV-2) on skin and surfaces such as PPE (personal protective equipment) are disclosed that are highly efficacious and exhibit total eradication below detectable limits at 30 minutes (>6 log kill) against coronavirus (resulting in complete inactivation), while remaining non-toxic, safe and non-irritating (including at a cellular level and with extended contact) to skin and endogenous tissue. Such disinfectant compositions are additionally highly effective against other pathogens, have extended antimicrobial and antiviral activity for more than 24 hours, have a bio-compatible pH, are suitable for personal, clinical and surgical use and are safe to skin, mucous membranes and wounds, remain stable without precipitation, discoloration or loss of antimicrobial efficacy for at least 12 months, and are beneficial for a range of applications and uses in improving and supporting human and animal health.

24 Claims, 2 Drawing Sheets

(56) References Cited

OTHER PUBLICATIONS

Zamora, J.L., "Chemical and Microbiologic Characteristics and Toxicity of Povidone-Iodine Solutions," American Journal of Surgery, 151(3): 400-406, Elsevier, Netherlands (1986).

Zhu, Z., et al., "Copper ions in biology," in Environmental Stressors and Gene Response, vol. 1, Chapter 20, Signaling in Copper Ion Homeostasis, pp. 293-300, Storey, K.B. and Storey, J.M., eds., Elsevier Science B.V., Netherlands (2000).

* cited by examiner

DISINFECTANTS WITH IODINE AND COPPER COMPLEXES FOR USE AGAINST CORONAVIRUS

BACKGROUND

Iodine is a well-established antiseptic and has been in use for more than 150 years. It is one of the most widely accepted antimicrobials in the world as it is active against bacteria, fungi and viruses and has no known acquired resistance.

The mechanisms of action for iodine can include: (I) penetration into the cell wall of the microorganism, causing blocking of the hydrogen bond which results in damage to the phospholipid cell membrane or (2) damage to and denaturing of the proteins, nucleotides and fatty acids, leading to rapid cell death by binding to thiol and sulphydryl groups.

One of the first antiseptic preparations of iodine was Lugol's solution. Developed in 1829, it consisted of an aqueous solution of elemental iodine (5%) and potassium iodide (10%) in distilled water or ethanol and was used as an antiseptic to treat wounds among other applications. However, the high levels of iodine caused pain and irritation when applied to open wounds as well as major problems and concerns regarding cytotoxicity, systemic absorption, and delayed wound healing.

In 1956 povidone iodine (PVP-I) was developed, consisting of a water-soluble combination of molecular iodine and polyvinylpyrrolidone. The 10% solution generally contains 90 percent water, 8.5 percent polyvinylpyrrolidone and 1 percent iodine/iodide. The terms iodine and iodide are often used interchangeably in the literature, despite the fact that there are several different forms and complexes of iodine which may have differing properties. Povidone-iodine as used in practice to disinfect surgical sites is typically as a solution containing 10% povidone-iodine, equivalent to 1% available iodine/iodide or 10,000 ppm. The available free iodine ($I_2$) depends on the formulation and concentration as it is a dependent equilibrium of povidone-bound iodine to free iodine. Studies have shown that most of the iodine in PVP-I is complexed in association with polyvinylpyrrolidone and iodide, with a small amount of free iodine ($I_2$) released. The free iodine level is dependent on the concentration of the solution and follows a bell-shaped curve, with levels of 1 ppm in 10% and 0.001% solutions and approximately 20 ppm in 0.1% solutions.

PVP-I, sold under the tradename Betadine®, is currently available as an antiseptic to treat minor cuts, scrapes or burns. It can be used surgically as a pre-scrub on intact skin. Betadine® is typically a 10% solution and has 1% (10,000 ppm) available iodine, but is not allowed for use in open wounds or non-intact skin. In vitro studies have suggested that PVP-I has a cytotoxic effect and can interfere with healing. Dilution may help reduce PVP-I's inhibition of the granulation and epithelialization processes involved in wound healing, but toxicity concerns remain. As a result, any off-label use of this product on non-intact skin, in wounds, or on or in surgical sites generally involves a very short application time followed by an immediate flush with saline. Effects of this dilution followed by saline flushing have not been comprehensively tested or proven with respect to the resulting cytotoxicity or antimicrobial profile and such a use is carried out without any recognized approvals for that indication.

Persistent use of antibiotics (antibacterials) has provoked the emergence of multidrug resistant (MDR) and extensively drug resistant (XDR) bacteria, which render even the most effective drugs ineffectual. One of the advantages of iodine as an antimicrobial is that bacterial resistance does not develop even with extended use as it does for many antibiotics. Hospital acquired infections are a serious and persistent problem, in part because many such pathogens have developed or exhibit multidrug resistance and virulence. Six of the most common and noxious nosocomial (hospital acquired) pathogens are known by the acronym ESKAPE, which includes: *Enterococcus faecium, Staphylococcus aureus, Klebsiella pneumoniae, Acinetobacter baumannii, Pseudomonas aeruginosa*, and *Enterobacter*.

Viruses are another form of pathogen addressed with antimicrobials. Coronaviruses are positive-stranded RNA viruses with large genome sizes that are known to cause diseases in animals and in humans. In humans, coronaviruses can cause respiratory tract infections that may be mild, such as the common cold.

But coronaviruses can also cause much more serious infections such coronavirus-induced severe acute respiratory syndrome (SARS). Woo et al., *Microbiol. Immunol.* 49:899-908 (2005). Seven strains of human coronaviruses are known: human coronavirus 229E (HCoV-229E); human coronavirus OC43 (HCoV-OC43); severe acute respiratory syndrome coronavirus (SARS-CoV); human coronavirus NL63 (HCoV-NL63, New Haven coronavirus); human coronavirus HKU1; Middle East respiratory syndrome-related coronavirus (MERS-CoV, also known as novel coronavirus 2012 and HCoV-EMC); and severe acute respiratory syndrome coronavirus 2 (SARS-CoV-2), also known as 2019-nCoV or novel coronavirus 2019.

In March 2020, the World Health Organization declared the outbreak of coronavirus disease 2019 (COVID-19) a pandemic. Like the severe acute respiratory syndrome (SARS) outbreak of 2003, and the Middle East respiratory syndrome (MERS) outbreaks of 2012, 2015, and 2018, COVID-19 has caused serious illness and death around the world.

Like iodine, various forms of copper are also known to have broad spectrum antimicrobial properties. Ancient civilizations exploited the antimicrobial properties of copper long before the concept of microbes became understood in the nineteenth century, both as copper based medicinal preparations and for transporting water, where water in copper vessels had far less biofouling or slime formation than when transported in other materials. This antimicrobial effect of copper has been further documented with respect to common nosocomial pathogens in aqueous solutions in more recent research. Copper and copper ions are used today as a water purifier, algaecide, fungicide and anti-fouling agent. Copper Iodide (CuI) is known to have some antiviral properties. And copper ions in copper sulfate solutions have been shown to reduce the hydrophobicity of biofilm—the water repelling nature of biofilm's outer layer—which can allow greater access to companion antimicrobials to the interior microbes within a biofilm.

Copper ions are essential for cellular physiology in the human body, playing a role in respiration, neural transmission, tissue maturation and iron metabolism. Excess copper levels in the body can be toxic, but in general microorganisms are far more susceptible to copper relative to the lower sensitivity of human tissue. The U.S. Environmental Protection Agency lists copper as both a micro-nutrient and a toxin.

Copper toxicity to micro-organisms including viruses, is thought to occur as a result of numerous mechanisms. Such mechanisms can include, for example, (1) the displacement of essential metals from their native binding sites; (2) interference with oxidative phosphorylation and osmotic balance; and (3) inducing alterations in the conformational structure of the nucleic acids, membranes and proteins of microbes.

The use of antimicrobials, and especially iodine, typically requires carefully balancing an antimicrobial's effectiveness against the risks of its toxicity to living tissue. Antimicrobial efficacy is not useful, beneficial or acceptable if it comes at the expense of damaging healthy tissue or interfering with or delaying the processes of wound healing. Most iodine-based formulations have difficulty achieving the appropriate balance. Copper, while more differentially damaging to microbes than human tissue at low concentrations, must also maintain this balance. With respect to iodine, formulations such as Betadine®'s PVP-I are not approved for use on wounds or non-intact skin. If medical professionals choose to use them on open wounds or surgical sites by diluting them, applying them and then flushing them out quickly in an attempt to avoid the toxic side effects, they engage in such off-label use at risk, as the procedure is not based on scientific evidence and the side effects are risky and unknown.

U.S. Pat. Nos. 8,846,067 and 8,642,057 describe antimicrobial solutions and delivery systems for them using liquid antimicrobial solutions with at least 80% of total weight of a carrier liquid comprising water, alcohol or a mixture of water and alcohol; at least 0.0001% by weight of the solution of iodine; at least 0.0001% by weight of copper sulfate; and sufficient acid in the solution to provide a pH of less than 7.0. A buffering system is also preferable in the solution, and the solution may be provided directly to wounds, burns or other skin damage as a liquid, as a spray or as a gel. US Patent Application No. 20180228837 describes antimicrobial solutions and delivery systems for them using liquid antimicrobial solutions that required at least medically effective amount of a peptide or metallopeptide to try to impart stability to the solution and without using an acidic agent as described in the '067 and '057 patents.

These prior art iodine solutions described above are not physiologically effective against pathogens at the entire low end of the ranges indicated and it was found through extensive testing that when the indicated additional functional additives are added to these types of iodine solutions such as an acidifying agent, buffer, or peptide or metallopeptide, the resulting solution's efficacy, pH and/or stability (either visual or functional or both) is significantly impaired to a point that renders the solution ineffective and unacceptable for use in wounds, surgical sites and/or burns.

As iodine is considered one of the most efficacious broad spectrum topical antiseptics, with no known resistance, it would represent a significant breakthrough to find or develop the formulation of a composition that releases sufficiently low levels of iodine so as to not cause any delay in wound healing or result in any toxicity to healthy tissues even under prolonged contact, while still proving highly effective against infection, pathogens and biofilms with sustained antimicrobial activity, all in a solution that demonstrates the long-term stability required of an effective medical product and a bio-compatible pH. Such a formulation, further leveraged by the antimicrobial and antibiofilm characteristics of appropriate copper complexes would represent a significant advancement in the standard of care and treatment of wounds and infection.

Such a composition that is non-toxic, safe and non-irritating to human skin and tissue, (including under prolonged contact) that is simultaneously highly effective at destroying or inactivating viruses such as coronaviruses would further provide an extremely useful and effective antimicrobial disinfectant for treating surfaces such as personal protective equipment (PPE), gloves, masks and/or skin and eliminating coronaviruses from such surfaces, one that could be used in situ as often and as frequently as necessary without causing any insult or irritation to surrounding skin and tissues.

SUMMARY

The present invention is directed to a stable antimicrobial composition for disinfection against the SARS-CoV-2 virus and other coronaviruses as well as the treatment of wounds and the prevention and/or treatment of infection or pathogens, including where the composition is non-toxic, safe, and non-irritating (including at a cellular level and for extended contact) to endogenous tissue and skin, has an effective antimicrobial activity for 24 hours or more with a greater than 4 log kill against pathogens (including but not limited to the ESKAPE pathogens), is effective against biofilm and coronaviruses, has a pH suitable for application on or within a body or wound, and is stable for at least 12 months without precipitation, discoloration or loss of antimicrobial efficacy.

The inventors of the present application spent many years of exploration, research and testing to develop such a product. After extensive work and experimentation on formulations and detailed stability, pH and efficacy testing, it was unexpectedly found that a mixture of potassium iodide at a first effective concentration by weight and copper sulfate at a second effective concentration by weight in a carrier liquid such as water or saline, without any other buffers, pH adjusters (e.g., acidifying agents) or surfactants, yielded a unique stable composition with exceptional antimicrobial and wound healing effects while having only an amount of free iodine in the composition of from about 100 ppm to about 330 ppm (e.g. about 250 ppm).

Such a composition, even without any other additives such as acidifying agents or peptides, has a pH of from about 3.5 to about 7.5 (typically from about 4.5 to about 6.0) which is biologically acceptable and does not cause harm or irritation to surrounding tissues, has an effective antimicrobial activity for 24 hours or more with a greater than 4 log kill rate against common pathogens, and remains stable without precipitation, discoloration or loss of antimicrobial efficacy for at least 12 months (e.g., up to 24 months or longer as required by the FDA for commercial use). The resulting product has a very safe and non-toxic profile, yet achieves the efficacy of its iodine predecessors that incorporate iodine at 1,000-100,000 ppm or more.

The bactericidal properties of this iodine copper complex solution have been assessed against bacterial pathogens commonly associated with wound infections, including methicillin-resistant *Staphylococcus aureus* (MRSA), vancomycin-resistant *Enterococcus faecalis* (VRE), and *Pseudomonas aeruginosa*. The composition has been shown to result in a greater than 4 log kill against common pathogens (including but not limited to the ESKAPE pathogens) within 24 hours and continues to exhibit safety and sustained activity at 3 days.

The composition described herein has also been tested against biofilm using an in vivo porcine model and exhibited a 2.3-2.4 log reduction against mature biofilm at 24 hours, more than double the 1 log reduction which is the current standard of care in the medical industry and the log reduction achieved using Povidone Iodine.

Some embodiments have further been tested against coronavirus, specifically SARS-CoV-2, and exhibited total eradication below detectable limits within 30 minutes (>6 log kill) against coronavirus.

Some embodiments described herein are useful for the treatment of wounds and burns, and to prevent and/or treat infections, including but not limited to bacterial, viral, fungal, and parasitic infections. It can be used as a treatment or prophylactically for all chronic or surgical site infections, including pathological wounds (e.g. diabetic or pressure ulcers), traumatic wounds due to injury, all manner of surgical wounds including oral surgery, and surgical wound cavities such as joint replacements. It can also be used to treat abrasions or skin infections and can also be used prophylactically as an oral rinse.

The disclosure describes iodine copper complex solutions that are also effective as a hospital-grade disinfectant powerful enough to provide disinfection and an added layer of protection for PPE and other surfaces while being gentle enough to use on skin including face and hands. The embodiments described herein are a safe, non-cytotoxic, tissue friendly solution with long-lasting antimicrobial activity (up to 3 days shown in GLP studies).

Other disinfectants are either intended for hard surfaces only and cannot be used on skin, or are intended only for skin (e.g., hand sanitizers). Hand sanitizers cannot be used on PPE, are typically active on the skin for only a few seconds up to a few minutes, and it is widely recognized that repeated application results in skin stripping and drying or cracking due to the high alcohol content. The iodine copper complex solutions described herein do not cause drying and cracking of the skin and can be safely and repeatedly used on PPE and skin without harm. The inventors have confirmed through level 3 lab testing at University of Texas Medical Branch—Galveston that such solution exhibited total eradication below detectable limits within 30 minutes (>6 log kill) against coronavirus. In other words, the iodine-copper complex eliminates the COVID-19 virus to below detectable levels, classified as complete inactivation.

In one embodiment of the present invention, a stable liquid antimicrobial composition that is non-toxic, safe and non-irritating (including at a cellular level and under extended contact) to endogenous tissue is disclosed which comprises at least about 95.0% of total weight of a carrier liquid; potassium iodide at a first effective concentration by weight; copper sulfate at a second effective concentration by weight; wherein a mixture of the first concentration of potassium iodide and the second concentration of copper sulfate generates an amount of free iodine in the composition of from about 100 ppm to about 330 ppm; and wherein the composition has a pH of from about 3.5 to about 7.5, demonstrates sustained antimicrobial activity for at least 24 hours with a greater than 4 log kill rate, and remains stable for at least 12 months.

In another embodiment, the composition may comprise from about 98.0% to about 99.9% by weight of the carrier liquid. The carrier liquid may comprise purified water, or more preferably saline (water plus NaCl) with a concentration of NaCl of from about 0% to about 3%, or most preferably saline with a concentration of NaCl of about 0.9%. The copper sulfate can be in the form of anhydrous copper sulfate or copper sulfate pentahydrate (the most common commercial form) or any other hydrate thereof. The composition preferably has a pH of from about 4.0 to about 7.0, or most preferably has a pH of from about 4.5 to about 6.0. The amount of free iodine generated in the composition can be from about 200 to about 300 ppm, and in one embodiment is about 250 ppm. In one embodiment, the first effective concentration is from about 0.025% to about 0.100% by weight and the second effective concentration is from about 0.016% to about 0.064% by weight if anhydrous copper sulfate is used or from about 0.025% to about 0.100% by weight if copper sulfate pentahydrate is used.

In one embodiment, the ratio of the first effective concentration to the second effective concentration is such that the ratio of the moles of potassium iodide to the moles of copper sulfate is from about 1.25 to about 1.75.

In another embodiment, the first concentration is about 0.0625% by weight and the second concentration is about 0.040% by weight if anhydrous copper sulfate is used or 0.0625% by weight if copper sulfate pentahydrate is used (where the 2 percentages represent equivalent amounts of copper sulfate), and the combination yields about 250 ppm of free iodine in the solution plus other copper complexes.

The composition preferably has an effective activity of at least three days and remains stable without precipitation, discoloration or loss of antimicrobial efficacy for at least 24 months. In an embodiment, the composition does not include any other buffers, pH adjusters or surfactants.

In another embodiment of the invention, a method of providing a stable antimicrobial composition that is non-toxic, safe and non-irritating (including at a cellular level and under extended contact) to endogenous tissue, has a pH of from about 4.0 to about 7.0, has an effective antimicrobial activity for at least 24 hours with a greater than 4 log kill rate, and remains stable without precipitation, discoloration or loss of antimicrobial efficacy for at least 24 months, is disclosed which comprises providing a carrier liquid comprising water or saline (e.g., water plus dissolved NaCl) wherein the carrier liquid comprises from about 95% to about 99.9% of the total weight of the composition; adding potassium iodide to the carrier liquid at a first effective concentration by weight; adding copper sulfate to the carrier liquid at a second effective concentration by weight, wherein the mixture of the potassium iodide and the copper sulfate in the carrier liquid generates an amount of free iodine in the composition of from about 100 ppm to about 330 ppm plus other copper complexes; and wherein the carrier liquid does not include any buffers, pH adjusters or surfactants.

In another embodiment of the invention, a stable liquid antimicrobial composition that is non-toxic, safe and non-irritating (including at a cellular level and under extended contact) to endogenous tissue is disclosed which comprises a carrier liquid of from about 98% to about 99.9% of total weight of the composition and comprising water or saline (water plus dissolved NaCl); potassium iodide at a first effective concentration by weight; copper sulfate at a second effective concentration by weight, wherein the ratio of the first effective concentration to the second effective concentration is such that the ratio of the moles of potassium iodide to the moles of copper sulfate is from about 1.25 to about 1.75; wherein the mixture of the potassium iodide and copper sulfate generates both an amount of free iodine in the composition of from about 100 ppm to about 330 ppm plus other copper complexes; and wherein the composition has a pH of from about 4.0 to about 7.0, has an effective antimicrobial activity for at least 24 hours with a greater than 4 log kill rate for the ESKAPE and other pathogens, and remains stable for at least 24 months without significant precipitation, discoloration or loss of antimicrobial efficacy.

In another embodiment of the invention, a stable liquid antimicrobial composition that is non-toxic, safe and non-irritating (including at a cellular level and under extended contact) to endogenous tissue is disclosed which comprises: a carrier liquid of from about 98% to about 99.9% of total weight of the composition and comprising water or saline (water plus dissolved NaCl); potassium iodide at a concentration by weight of about 0.0625%; copper sulfate pentahydrate at a concentration by weight of about 0.0625%, wherein the mixture of the respective concentrations of potassium iodide and copper sulfate pentahydrate is such that the potassium iodide is the reaction limiting component and generates both free iodine in solution at an amount of about 250 ppm plus other copper complexes, without precipitation or discoloration of the composition; and wherein the composition has a pH of from about 4.0 to about 7.0, has an effective antimicrobial activity for at least 24 hours with a greater than 4 log kill rate for the ESKAPE and other pathogens, remains stable without loss of antimicrobial efficacy for at least 24 months, and does not include any buffers, pH adjusters or surfactants.

In one embodiment of the present invention, a stable liquid antimicrobial disinfectant composition that is non-toxic, safe and non-irritating (including at a cellular level and under extended contact) to skin and endogenous tissue is disclosed which comprises at least 95.0% of total weight of a carrier liquid; potassium iodide at a first effective concentration by weight; copper sulfate at a second effective concentration by weight; wherein a mixture of the first concentration of potassium iodide and the second concentration of copper sulfate generates an amount of free iodine in the composition of from about 100 ppm to about 330 ppm; and wherein the composition has a pH of from about 3.5 to about 7.5, demonstrates sustained antimicrobial and antiviral activity for 24 hours or more with total eradication below detectable limits within 30 minutes (>6 log kill) against coronavirus, and remains stable for at least 12 months.

In an embodiment, the composition may comprise from about 98.0% to about 99.9% by weight of the carrier liquid. The carrier liquid may comprise purified water, or more preferably saline (water plus NaCl) with a concentration of NaCl of from about 0% to about 3%, or most preferably saline with a concentration of NaCl of about 0.9%. The copper sulfate can be in the form of anhydrous copper sulfate or copper sulfate pentahydrate (the most common commercial form) or any other hydrate thereof. The composition preferably has a pH of from about 4.0 to about 7.0, or most preferably a pH of from about 4.5 to about 6.0. The amount of free iodine generated in the composition can be from about 200 to about 300 ppm, and in one embodiment is about 250 ppm. In one embodiment, the first effective concentration is from about 0.025% to about 0.100% by weight and the second effective concentration is from about 0.016% to about 0.064% by weight if anhydrous copper sulfate is used or from about 0.025% to about 0.100% by weight if copper sulfate pentahydrate is used.

In an embodiment, the ratio of the first effective concentration to the second effective concentration is such that the ratio of the moles of potassium iodide to the moles of copper sulfate is from about 1.25 to about 1.75.

In an embodiment, the first concentration is about 0.0625% by weight and the second concentration is about 0.040% by weight if anhydrous copper sulfate is used or 0.0625% by weight if copper sulfate pentahydrate is used (where the 2 percentages represent equivalent amounts of copper sulfate), and the combination yields about 250 ppm of free iodine in the solution plus other copper complexes.

The composition preferably has an effective activity of at least three days and remains stable without precipitation, discoloration or loss of antimicrobial efficacy for at least 24 months. In an embodiment, the composition does not include any other buffers, pH adjusters or surfactants.

In an embodiment, the coronavirus is a human coronavirus. The human coronavirus can be HCoV-229E, HCoV-OC43, HCoV-NL63, HCoV-HKU1, SARS-CoV, MERS-CoV, or SARS-CoV-2, or a mutated strain thereof. In an embodiment, the coronavirus is the human coronavirus SARS-CoV-2, or a mutated strain thereof.

In another embodiment of the invention, a method of providing a stable antimicrobial disinfectant solution that is non-toxic, safe and non-irritating (including at a cellular level and under extended contact) to skin and endogenous tissue, has a pH of from about 4.0 to about 7.0, has an effective antimicrobial and antiviral activity for at least 24 hours with total eradication below detectable limits within 30 minutes (>6 log kill) against coronavirus, and remains stable without precipitation, discoloration or loss of antimicrobial efficacy for at least 24 months, is disclosed which comprises providing a carrier liquid comprising water or saline (e.g., water plus dissolved NaCl) wherein the carrier liquid comprises from about 95% to about 99.9% of the total weight of the composition; adding potassium iodide to the carrier liquid at a first effective concentration by weight; adding copper sulfate to the carrier liquid at a second effective concentration by weight, wherein the ratio of the first and second effective concentrations is such that the potassium iodide is the reaction limiting component, and wherein the mixture of the potassium iodide and the copper sulfate in the carrier liquid generates an amount of free iodine in the composition of from about 100 ppm to about 330 ppm plus other copper complexes; and wherein the carrier liquid does not include any buffers, pH adjusters or surfactants. In an embodiment, the coronavirus is a human coronavirus such as HCoV-229E, HCoV-OC43, HCoV-NL63, HCoV-HKU1, SARS-CoV, MERS-CoV, or SARS-CoV-2, or a mutated strain thereof. In an embodiment, the coronavirus is the human coronavirus SARS-CoV-2, or a mutated strain thereof.

In another embodiment of the invention, a stable liquid antimicrobial disinfectant composition that is non-toxic, safe and non-irritating (including at a cellular level and under extended contact) to skin and endogenous tissue is disclosed which comprises a carrier liquid of from about 98% to about 99.9% of total weight of the composition and comprising water or saline (water plus dissolved NaCl); potassium iodide at a first effective concentration by weight; copper sulfate pentahydrate at a second effective concentration by weight, wherein the ratio of the first effective concentration to the second effective concentration is such that the ratio of the moles of potassium iodide to the moles of copper sulfate is from about 1.25 to about 1.75; wherein the mixture of the potassium iodide and copper sulfate generates both an amount of free iodine in the composition of from about 100 ppm to about 330 ppm plus other copper complexes; and wherein the composition has a pH of from about 4.0 to about 7.0, has an effective antimicrobial and antiviral activity for at least 24 hours with total eradication below detectable limits within 30 minutes (>6 log kill) against coronavirus, and remains stable for at least 24 months without significant precipitation, discoloration or loss of antimicrobial efficacy. In an embodiment, the coronavirus is a human coronavirus such as HCoV-229E, HCoV-OC43, HCoV-NL63, HCoV-HKU1, SARS-CoV, MERS-CoV, or SARS-CoV-2, or a mutated strain thereof. In an embodiment, the coronavirus is the human coronavirus SARS-CoV-2, or a mutated strain thereof.

In another embodiment of the invention, a stable liquid antimicrobial disinfectant composition that is non-toxic, safe and non-irritating (including at a cellular level and under extended contact) to skin and endogenous tissue is disclosed which comprises: a carrier liquid of from about 98% to about 99.9% of total weight of the composition and comprising water or saline (water plus dissolved NaCl); potassium iodide at a concentration by weight of about 0.0625%; copper sulfate pentahydrate at a concentration by weight of about 0.0625%, wherein the mixture of the respective concentrations of potassium iodide and copper sulfate pentahydrate is such that the potassium iodide is the reaction limiting component and generates both free iodine in solution at an amount of about 250 ppm plus other copper complexes, without significant precipitation or discoloration of the composition; and wherein the composition has a pH of from about 4.0 to about 7.0, has an effective antimicrobial and antiviral activity for at least 24 hours with total eradication below detectable limits within 30 minutes (>6 log kill) against coronavirus, remains stable for at least 24 months without loss of antimicrobial efficacy, and does not include any buffers, pH adjusters or surfactants. In an embodiment, the coronavirus is a human coronavirus such as HCoV-229E, HCoV-OC43, HCoV-NL63, HCoV-HKU1, SARS-CoV, MERS-CoV, or SARS-CoV-2, or a mutated strain thereof. In an embodiment, the coronavirus is the human coronavirus SARS-CoV-2, or a mutated strain thereof.

In all the described embodiments, the copper sulfate used may be in either of the two commercially available forms—anhydrous copper sulfate ($CuSO_4$) or copper sulfate pentahydrate ($CuSO_4*5H_2O$)—or in any other hydrated form, so long as the concentration is adjusted to keep the net moles of Cu the same (e.g. 0.040% by weight of $CuSO_4$ can be replaced by 0.0625% by weight of $CuSO_4*5H_2O$). The small increase in the weight due to the hydrated forms of copper sulfate would be offset by an equivalent small reduction in the weight or percentage of water or carrier liquid as would be clear to one skilled in the art.

These and other features, aspects, and advantages of the present invention will become better understood with reference to the following description and appended claims.

DETAILED DESCRIPTION

Figure 1:
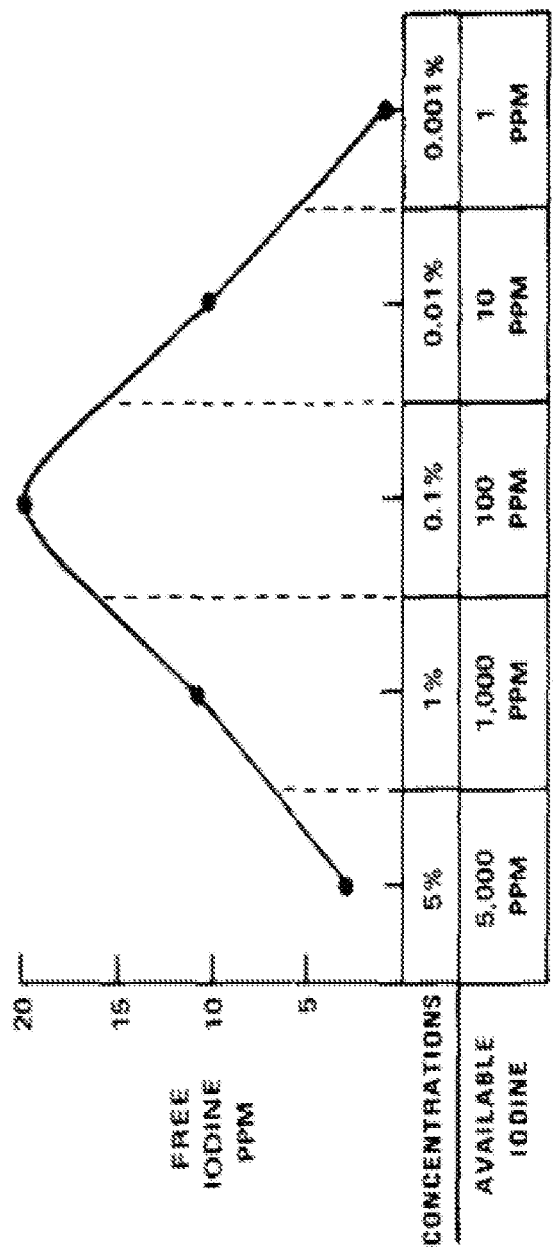
FIG. 1 shows free iodine levels in povidone-iodine aqueous solutions measured in parts per million.

The present invention is directed to a stable antimicrobial composition for the treatment of wounds and the prevention and/or treatment of infection or pathogens, including disinfection against the SARS-CoV-2 virus and other coronaviruses, where the composition is non-toxic, safe and non-irritating (including at a cellular level and for extended contact) to endogenous tissue and skin, has an effective antimicrobial activity for 24 hours or more with a greater than 4 log kill against pathogens (including but not limited to the ESKAPE pathogens), is effective against biofilm and coronaviruses, has a pH suitable for application on or within a body or wound, and is stable for at least 12 months without precipitation, discoloration or loss of antimicrobial efficacy.

All publications, patents, and other references mentioned herein are incorporated by reference in their entireties for all purposes as if each individual publication or patent application were specifically and individually indicated to be incorporated by reference. In addition, citation or identification of any reference in this application shall not be construed as an admission that such reference is available as prior art to the present invention.

Terminology

Unless defined otherwise, all technical and scientific terms used herein have the same meaning as commonly understood by one of ordinary skill in the art to which this invention belongs. In case of conflict, the present application including the definitions will control. Unless otherwise required by context, singular terms shall include pluralities and plural terms shall include the singular.

To the extent that section headings are used, they should not be construed as necessarily limiting.

As used herein and in the appended claims, the singular forms "a," "an," and "the" include plural references unless the context clearly dictates otherwise. For example, the term "a compound" or "at least one compound" may include a plurality of compounds, including mixtures thereof. The terms "a", "an", "the," "one or more," and "at least one," for example, can be used interchangeably herein.

As used herein, the term "about," when used to modify an amount related to the invention, refers to variation in the numerical quantity that can occur, for example, through routine testing and handling; through inadvertent error in such testing and handling; through differences in the manufacture, source, or purity of ingredients employed in the invention; and the like. Whether or not modified by the term "about", the claims include equivalents of the recited quantities. In some embodiments, the term "about" means plus or minus 10% of the reported numerical value.

Throughout this application, various embodiments of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range, such as from 1 to 6 should be considered to have specifically disclosed subranges such as from 1 to 2, from 1 to 3, from 1 to 4, from 1 to 5, from 2 to 3, from 2 to 4, from 2 to 5, from 2 to 6, from 3 to 4, from 3 to 5, from 3 to 6, etc., as well as individual numbers within that range, for example, 1, 2, 3, 4, 5, and 6. This applies regardless of the breadth of the range.

The terms "comprises," "comprising," "includes," "including," "having," and their conjugates are interchangeable and mean "including but not limited to." It is understood that wherever aspects are described herein with the language "comprising," otherwise analogous aspects described in terms of "consisting of" and/or "consisting essentially of" are also provided.

The term "consisting of" means "including and limited to."

The term "consisting essentially of" means the specified material of a composition, or the specified steps of a method, and those additional materials or steps that do not materially affect the basic characteristics of the material or method.

The term "and/or" where used herein is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

The term "antimicrobial" refers to agents that act against and typically kill, or stop or slow the growth or spread of various types of pathogens (e.g., bacteria (antibacterial), viruses (antiviral), fungi (antifungal) and protozoa (antiprotozoal).

The term "effective amount" as used herein refers to an amount that achieves a desired result.

As used herein, a "therapeutically effective amount" or "medically effective amount" refers to an amount, that achieves a desired therapeutic result, including, e.g., an amount whether used alone or in combination with other components. A therapeutic result can be, e.g., lessening of symptoms, prolonged survival, improved mobility, and the like. A therapeutic result need not be a "cure."

The terms "treat," "treating," and "treatment" refer to both therapeutic treatment and prophylactic or preventative measures, wherein the object is to prevent or slow down (lessen) an undesired physiological condition, disease, or disorder, or to obtain beneficial or desired physiological results (e.g., clinical, medical, and/or veterinary results). For purposes of this invention, beneficial or desired results include, but are not limited to, alleviation or elimination of the symptoms or signs associated with a condition, disease, or disorder; diminishment of the extent of a condition, disease, or disorder; stabilization of a condition, disease, or disorder, (i.e., where the condition, disease, or disorder is not worsening); delay in onset or progression of the condition, disease, or disorder; amelioration of the condition, disease, or disorder; remission (whether partial or total and whether detectable or undetectable) of the condition, disease, or disorder; or enhancement or improvement of a condition, disease, or disorder. Treatment includes eliciting a physiologically significant response without excessive side effects. Treatment also includes prolonging survival as compared to expected survival if not receiving treatment.

As used herein, the terms "prevent" and "preventing" refer to partially or completely delaying onset of an infection, disease, disorder, and/or condition; partially or completely delaying onset of one or more signs, symptoms, features, or manifestations (e.g., clinical or physiological signs, symptoms, features, or manifestations) of a particular infection, disease, disorder, and/or condition; partially or completely delaying progression from an infection, a particular disease, disorder, and/or condition; and/or decreasing the risk of developing a pathology associated with the infection, the disease, disorder, and/or condition.

The terms "invention" and "disclosure" can be used interchangeably when describing or used, for example, in the phrases "the present invention" or "the present disclosure."

The terms "animal" or "subject" refer to any organism belonging to the kingdom Animalia and includes, without limitation, aquatic animals and terrestrial animals such as fish; commercial fish; ornamental fish; fish larvae; bivalves; mollusks; crustaceans; shellfish; shrimp; larval shrimp; artemia; rotifers; brine shrimp; filter feeders; amphibians; reptiles; mammals; humans; non-human animals; domestic animals; farm animals; zoo animals; sport animals; breeding stock; racing animals; show animals; heirloom animals; rare or endangered animals; companion animals; pet animals such as dogs, cats, guinea pigs, rabbits, rats, mice, or horses; primates such as monkeys (e.g., cebus, rhesus, African green, patas, cynomolgus, and cercopithecus), apes, orangutans, baboons, gibbons, and chimpanzees; canids such as dogs and wolves; felids such as cats, lions, and tigers; equids such as horses, ponies, donkeys, mules, and zebras; food animals such as cows, buffalo, cattle, pigs, poultry, and sheep; ungulates such as deer and giraffes; avians (i.e., birds); poultry such as chickens, geese, ducks, quails, turkeys, pigeons, emus, and ostriches.

The term "infection" refers to invasion and multiplication of microorganisms (e.g., bacteria, viruses, fungi, and protozoa).

The term "non-toxic" or "safe" refers to not being harmful or damaging to cells, tissues, or organisms. The term "non-irritating" refers to not causing or resulting in irritation when applied to or in contact with skin or tissue.

The term "pathogen" refers to an infectious agent and/or a biological agent that causes disease or illness to its host (e.g., bacteria, viruses, fungi, and protozoa).

The term "biofilm" refers to a collection of one or more types of microorganisms that can grow on many different surfaces.

The term "endogenous tissue" refers to the native cells and tissues of the human or animal host that is being treated; tissues that may be healthy or damaged but that are an integral portion of the whole organism.

The term "copper complexes" refers to all reaction byproducts comprising copper, including the CuI, the $CuSO_4$, the $Cu^{++}$ ions resulting from its dissociation, and other forms found in solution such $Cu(H_2O)_6^{2+}$ (Hexaaquacopper ion), which result from the mixture of the components of the composition.

The term "iodine copper complex solution" refers to the solution containing the free iodine and the copper complexes which result from the mixture of the components of the composition.

It is appreciated that certain features of the invention, which are, for clarity, described in the context of separate embodiments, can also be provided in combination in a single embodiment. Conversely, various features of the invention, which are, for brevity, described in the context of a single embodiment, can also be provided separately or in any suitable subcombination or as suitable in any other described embodiment of the invention. Certain features described in the context of various embodiments are not to be considered essential features of those embodiments, unless the embodiment is inoperative without those elements.

Although methods and materials similar or equivalent to those described herein can be used in practice or testing of the present invention, suitable methods and materials are described below. The materials, methods and examples are illustrative only and are not intended to be limiting. Other features and advantages of the invention will be apparent from the detailed description and from the claims.

Antimicrobial Compositions

As noted above, iodine solutions have been used for many years as antimicrobial agents, but have a reputation for interfering with wound healing and for being cytotoxic. Indeed, most antimicrobials of all types (not just iodine-based) such as chlorhexidine, iodine tincture, Octenisept, Lugol's solution, silver, PVP-I, etc. can have a cytotoxic effect on cells, cause inflammation, result in tissue necrosis, or interfere with granulation and epithelialization processes involved in wound healing. Doctors are constantly required to balance the anti-microbial and anti-viral effectiveness and properties of the products and compositions they use against their cytotoxicity and potential to do harm.

It would therefore be highly desirable to have a clear, odorless and colorless iodine-based antimicrobial and antiviral solution that is non-toxic, safe and non-irritating (including at a cellular level and under extended contact) to skin and endogenous tissue, while simultaneously exhibiting sustained antimicrobial and antiviral activity for 24 hours or more with a greater than 4 log kill rate against common pathogens (including the noxious nosocomial ESKAPE pathogens) and total eradication below detectable limits within 30 minutes (>6 log kill) against coronavirus (with continued activity for 3 days or more), while having a pH that is bio-compatible (for example from about 4.0 to about 7.0) to insure no pain or stinging on application plus no acidic/alkaline negative clinical outcomes, and while exhibiting long term stability for at least 24 months without precipitation, discoloration or loss of antimicrobial efficacy. Such a solution would permit far greater effective application across a wide range of medical needs without concern for detrimental effects to skin, tissue or wounds than existing products, offerings or compositions provide.

The inventors of the present invention spent many years of experimentation and development to develop just such a composition. Many formulas of varying concentrations and with numerous different additives associated with some degree of medical benefit were tested. However, much of their work proved to be generally unacceptable as the combinations that were developed and tested often did not exhibit stability for commercially acceptable periods of time, showed discoloration and/or precipitation, had a pH too low (e.g., below 3.5) to allow for medical application, exhibited some cytotoxicity, or were not sufficiently effective as an antimicrobial.

Unexpectedly, after many previous attempts to find an optimal iodine-based composition for wound healing and the prevention and treatment of infection, the inventors surprisingly discovered that the iodine and copper based formula as described herein remains stable at room temperature (e.g. at least 6 months, more preferably at least 1 year and most preferably 2 years or more) without precipitation, discoloration or loss of antimicrobial efficacy, has an acceptable/ optimal pH for wounds (e.g., a pH of from about 3.5 to about 7.5, e.g. from about 4.0 to about 7.0, e.g. from about 4.5 to about 6.0), is non-toxic, safe and non-irritating (including at a cellular level and under extended contact) to skin and endogenous tissue, has an effective antimicrobial and antiviral activity of at least 24 hours with a greater than 4 log kill rate against common pathogens (including the ESKAPE pathogens) and total eradication below detectable limits within 30 minutes (>6 log kill) against coronavirus, exhibits sustained activity for more than 3 days, and does not contain any buffers, acidifying agents (such as sulfamic acid or other acids which can lead to an unacceptably low pH) or any other peptide ingredients. The claimed invention described herein is a result of that long effort and provides a unique medical material that is antimicrobial, antiviral, stable and provides exceptional infection control and wound healing benefits not previously available in a solution that can be applied in such a broad variety of ways, with far greater latitude, and without any concerns or need to rinse it out for fear of toxicity.

As explained below, the invention hinged on the discovery of a careful balance or ratio of the components coupled with concentrations fine-tuned to keep the iodine concentration below solubility levels, while simultaneously enlisting the added efficacy of certain copper complex reaction byproducts.

All the embodiments of the invention as detailed above comprise potassium iodide and copper sulfate. The copper sulfate used may be in either of the two commercially available forms—anhydrous copper sulfate ($CuSO_4$) or copper sulfate pentahydrate ($CuSO_4 * 5H_2O$)—or in any other hydrated form. For the purposes of the discussion of chemistry below, we will use copper sulfate pentahydrate as this is the most commonly available commercial form.

The combination of potassium iodide and copper sulfate pentahydrate (the common commercial form) is governed by the following chemical reaction when the components are in the appropriate stoichiometric ratio of 2:1.

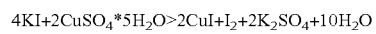

$$4KI + 2CuSO_4 * 5H_2O > 2CuI + I_2 + 2K_2SO_4 + 10H_2O$$

As an aside, note that if excess potassium iodide (KI) is available in the presence of elemental iodine then the following reaction may occur:

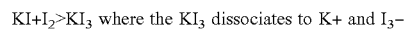

$$KI + I_2 > KI_3 \text{ where the } KI_3 \text{ dissociates to } K^+ \text{ and } I_3^-$$

In the presence of such excess potassium iodide, the molecular or free iodine ($I_2$) is thus largely converted to triiodide ($I_3^-$) or other polyiodide ions. High concentrations of triiodide ions are present in Lugol's solution and are responsible for the brown color of the solution.

One of the contributing insights of the inventors was that by limiting the ratio of potassium iodide to copper sulfate to less than the stoichiometric ratio of the first equation above, then the potassium iodide would become the reaction limiting component. Thus if the molar quantity of potassium iodide is less than twice that of the copper sulfate, the potassium iodide is the reaction limiting component. It is believed that this results in the iodine of the KI being fully converted to free iodine ($I_2$) and copper iodide (CuI) without any subsequent conversion to triiodide and leaves residual unreacted copper sulfate in solution as a source of copper ions. On the other hand, if the ratio of potassium iodide to copper sulfate is too low, then very little free iodine is generated (and very little copper iodide), which is problematic as it is believed that the free iodine is largely responsible for a significant portion of the antimicrobial efficacy. So a balance needs to be struck, using enough KI to generate a useful amount of $I_2$ and CuI, while making sure that the KI is the reaction limiting factor. A molar ratio (KI to $CuSO_4$) of more than 1:1 and less than 2:1 was settled on with a preferred ratio of from about 1.25:1 to about 1.75:1, for example with a ratio of about 1.5:1. Note that the full conversion of the KI to I2 and CuI insures that a high level (50%) of the total iodine in the solution is present as free iodine ($I_2$), in contrast to formulations such as PVP-I where, as shown in FIG. 1, the amount of free iodine is minimal compared to the total iodine present in the solution and does not exceed around 20 ppm.

The effective chemical reaction at the indicated molar ratio of KI to $CuSO_4(*5H_2O)$ of about 1.5 to 1 can be modeled as follows:

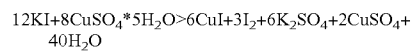

$$12KI + 8CuSO_4 * 5H_2O > 6CuI + 3I_2 + 6K_2SO_4 + 2CuSO_4 + 40H_2O$$

Experimentation further determined that if the concentration of potassium iodide was selected so as to yield 200-660 ppm in solution while keeping the molar ratio of potassium iodide to copper sulfate below 2:1 as described above, the resulting solution would contain an antimicrobially effective concentration of $I_2$ of 100-330 ppm (half the iodine reacts to become $I_2$ while the other half combines with the copper to become CuI) while remaining below the free iodine solubility level of about 330 ppm. It is believed that these low concentrations also allow the relatively insoluble CuI to remain in solution and support the extended stability exhibited by and required of the composition, as well as to provide additional antimicrobial activity. Copper sulfate also has known antimicrobial properties and the residual copper sulfate may further enhance the composition's effectiveness while the extremely low concentration present may help avoid any irritation it might otherwise have to healthy tissue in higher doses. Additionally, the copper ions of the residual copper sulfate are believed to interact with biofilms so as to reduce their hydrophobicity, thereby allowing the balance of the solution's antimicrobial components access to the bacteria interior to the biofilm and enhancing the antimicrobial/antibiofilm efficacy.

Together these factors combine to create and support the non-toxicity and safety of the formulation even under long term contact (e.g., 24 hours, or as tested up to 30 days) while simultaneously allowing it to serve as an effective antimicrobial and antiviral. The extended contact (with skin or endogenous tissue) allowed by the lack of toxicity further leverages the sustained antimicrobial action of the solution, which helps the composition exhibit the previously seemingly unachievable balance of a greater than 4 log kill with complete safety and non-toxicity, providing a substantial and highly desirable utility in wound care, the treatment and prevention of infection, the killing of dangerous pathogens, and the disinfection of viruses such as coronaviruses on skin, PPE, and surfaces.

It was further discovered through testing that the addition of numerous other elements with potentially desirable properties such as buffers, acidifiers, emulsifiers, medical peptides, etc. often disrupted the subtle balance that had been achieved and resulted in unacceptable pH, precipitation, discoloration, lack of long-term stability, reduced antimicrobial efficacy, or a degree of cyto-toxicity, which helped to confirm and validate the uniqueness, novelty and unexpected results of the solution that the inventors had developed. This was further confirmed by the extensive testing required by regulatory agency personnel who remained unconvinced until confronted with incontrovertible test results including extensive live animal studies that it was possible that an iodine copper solution simultaneously be non-toxic, safe and non-irritating to skin, tissue and wounds even with prolonged contact, cause no detrimental effects or delay in wound healing, have a biocompatible pH, demonstrate long term stability without discoloration, precipitation or loss of efficacy, and yet demonstrate sustained antimicrobial and antiviral activity for at least 24 hours with a 4 log kill against the nosocomial ESKAPE and other pathogens and total eradication below detectable limits within 30 minutes (>6 log kill) against coronavirus.

An embodiment of the present invention has been approved by the FDA and is intended for use by healthcare professionals for cleansing, irrigating, moistening and debriding (removing wound debris) acute and chronic dermal lesions that are partial or full thickness wounds such as 1st and 2nd degree burns, stage I-IV pressure ulcers, diabetic ulcers, stasis ulcers, abrasions and minor skin irritations, post-surgical wounds, and grafted and donor sites, as well as for use in moistening and lubricating absorbent wound dressings. The compositions described herein can also be used as a preventative and treatment for infection on or in the body, wounds or surgical openings or cavities. An embodiment of the present invention has also been registered by the FDA for use as a disinfectant effective against coronavirus and SARS-CoV-2, the virus responsible for COVID-19.

The determination of an appropriate pH range for the present invention was made based on the pH of healthy skin and wounds. Healthy, intact skin has a slightly acidic pH ranging from 4.0 to 6.0. The pH is an important aspect of the skin's barrier function, helping to regulate bacterial flora and prevent infection. When a wound occurs, the skin's acidic milieu and pH is disrupted, exposing the more neutral pH of the underlying tissue. With successful healing and re-epithelialization, the skin returns to being acidic. Acute wounds have a more neutral pH and, during acute wound healing, there is a drop in pH caused by various factors, including hypoxia and increased production of lactic acid. An acidic pH environment is considered to be beneficial, by increasing fibroblast proliferation and migration and also regulating bacterial colonization. If, however wound healing is delayed, then the pH will oscillate and become increasingly alkaline over time. At this stage the wound is described as chronic and the synthesis of ECM molecules becomes impaired, thus arresting the healing process. In light of this, the desired pH range of an effective antimicrobial is optimally in the range of 4.0-7.0, for example the pH is in the range 4.5-6.0.

As described above, the copper sulfate used in the compositions may be in either of the two commercially available forms—anhydrous copper sulfate ($CuSO_4$) or copper sulfate pentahydrate ($CuSO_4*5H_2O$)—or in any other hydrated form, so long as the respective concentration is adjusted to keep the net moles of Cu the same.

The subtle balance and concentration ranges of the components of the composition discovered by the inventors is easily disturbed by the addition of other elements which might be thought to have a salutary effect, often resulting instead in one of more of unacceptable pH, lack of stability, precipitation, discoloration, interference with sustained activity, diminishment of antimicrobial and antiviral activity, or some level of cyto-toxicity, as was determined by the inventors during the extensive testing of the composition with various additives and alterations. Nonetheless, it may be possible within carefully tested and constrained limits to augment the composition with additional elements while maintaining the fundamental characteristics and benefits thereof.

In some embodiments, the compositions according to the present invention can be directly applied to skin or wounds, used in all surgical sites before, during or after surgery to prevent or treat infection, used as a lavage, used as an oral rinse or wash, or used as a spray to disinfect skin, surfaces and PPE, as well as being used to impregnate fabric, sheets or layers of other materials such as cotton, gauze, dressings, compresses, bandages and the like. However, in addition to such uses, other materials may be used to apply, disperse or augment the compositions. Examples include emulsions, alginates, natural and synthetic thickeners (e.g., cellulose gum, dextrose, CMC, Thymulen®, etc.), polysiloxanes, polymeric carriers, liquid polyols (such as glycerol and PEG), solvents, superabsorbents, collagen, biological carriers such as tissue or cells, PPP (platelet poor plasma), or PRP (platelet rich plasma), oxygen or nitric oxide donors, and the like.

In such applications, the compositions and solutions may be incorporated within such additional materials or carriers or be combined with them, possibly in greater concentration where the composition or solution may subsequently flow out of the carrier and onto the skin or into the wound at the appropriate concentration levels.

Although a buffering agent is not needed to provide the composition described herein with a medical benefit, a buffering agent such as inorganic cation buffering agents including carbonates, bicarbonates, phosphates and other inorganic salts (such as those of sodium, calcium, potassium and lithium) can be added to the solutions.

The compositions according to the present invention may additionally comprise an antibiotic including without limitation neomycin, vancomycin, bacitracin, gentamicin, polymyxin, or may additionally comprise a sulfa drug (e.g., prontosil, sulfadiazine, sulfamethizole (Thiosulfil Forte™), sulfainethoxazole (Gantanol™), sulfasalazine (Azulfidine™), sulfisoxazole (Gantrisin™), and various high-strength combinations of three sulfonamides).

The compositions according to the present invention may further comprise an agent that promotes degradation of biofilms on open wounds such as surfactants like polyhexamethylene biguanide or PHMB (Prontosan®), Bactisure®, and the like.

The compositions according to the present invention can optionally further comprise any active pharmaceutical agent for specific treatment regimens, or any acceptable excipient, including without limitation colorants, deodorants, fragrances, flavorings, preservatives and the like.

The compositions according to the present invention can be used as a treatment for all manner of wounds and burns, for the prevention or treatment of infection on skin, in wounds, or for any surgical site for both intact or non-intact skin, or for use as a disinfectant to eliminate viral contamination and as a treatment against coronavirus on skin, mucous membranes, personal protective equipment (PPE), and equipment or surfaces.

The compositions described herein are useful in direct medical treatment of wounds, sores, topical conditions, skin infections, including tissue injuries and those characterized by delay or complete failure of healing. Typical but non-limiting examples of such injuries are traumatic injury including burns, injury resulting from surgery, diabetic wounds, pressure ulcers, arterial ulcers, and decubitus ulcers. The compositions may be directly applied to the region of the patient where treatment is desired. They may be used for cleansing, irrigating, and debriding dermal wounds in addition to moistening and lubricating absorbent wound dressings (e.g., gauze). They may be used in plastic surgery operations and in total joint replacements, either as a prophylactic, during surgery or to treat post-surgical infection. As the compositions are non-toxic, safe and non-irritating to tissue even with extended contact, no wash-out of the composition is necessary. It may be applied and left in place, or flushed into or through a wound where any residual solution can be left in place and remains antimicrobially active.

The treatment of open wounds and burns according to the present invention typically comprises topical administration of the composition or of a combination of the composition and other medicaments, or of medicaments containing the composition, to the open wound or burn. The medicament is preferably applied to the wounds or burns in amounts sufficient to completely cover the entire surface of the wound. There is no need to rinse or remove the treatment, which may be left in place to take advantage of the lack of toxicity and the sustained activity of the compositions. The treatment is continued as long as necessary to completely heal the wounds or burns it is applied to, or as long as beneficial effects are observed.

The compositions described herein can also be used in oral surgery applications as a pre-surgical rinse, a wash during surgery, and a post-surgical rinse. They can also be applied through the dental instruments as a spray rinse during oral surgery or dental procedures. They can also be used as a regular mouthwash to reduce the bacteria responsible for plaque buildup on the teeth.

The compositions described herein can also be used on animals in the same ways described herein for use on humans, including but not limited to the treatment of wounds, the prevention and/or treatment of infection, as a prophylactic or treatment before, during or after surgery of all types, as an oral rinse, as a disinfectant, etc.

Although the aforementioned methods of treatment generally apply, it is within the skill and within the objective of any professional, trained in the art of wound healing or infection prevention or treatment, or surgery, or oral or dental care to adjust the preferred amounts of the composition and/or the frequency with which it is applied, as well as the duration of the treatment, in order to optimize the efficacy for each individual patient or subject. The materials and compositions of the invention may be applied to wounds, burns, cuts, surgical sites, mucosal tissue, mucosal membrane, and/or the skin for any after-event medical condition or pre-event medical condition. In some embodiments, the antimicrobial compositions are effective as a hospital-grade disinfectant powerful enough to provide disinfection and an added layer of protection for PPE and other surfaces against coronavirus, e.g., SARS-CoV-2, while being gentle enough to use on skin including face and hands. They can also be used to sanitize used protective masks and other PPE, especially from coronavirus, e.g., SARS-CoV-2. They provide a safe, non-toxic, non-irritating, tissue friendly solution with long-lasting antimicrobial and antiviral activity (up to 3 days shown in GLP studies) that can be applied directly to the hands, face and skin. By contrast, alternative antimicrobials for skin such as hand sanitizer products based on 60-70% alcohol are active on the skin for only a few seconds up to a few minutes, and are known to cause drying and cracking of the skin with continued use. The compositions according to the present invention do not cause any such drying or cracking of the skin, are not sticky and leave no residue, and can be safely and repeatedly used on PPE and skin without harm. Level 3 lab testing at University of Texas Medical Branch—Galveston has confirmed that the composition exhibits total eradication below detectable limits at 30 minutes (>6 log kill) against coronavirus, specifically the COVID-19 virus, thereby resulting in complete inactivation.

All references cited in this disclosure are incorporated by reference in their entirety.

Testing Studies and Results

1. Iodine Concentration Testing:

The primary purpose of this study, performed by an independent third party laboratory, was to provide supporting data requested by the U.S. Food and Drug Administration (FDA) related to chemical composition data for the Clyra™ Solution described below. In addition, corresponding data points have been included to show iodine/iodide concentrations over multiple time points to model room temperature storage and stability.

The Clyra™ Solution used in the studies below is as follows (expressed as concentrations):

| | |
|---|---|
| 625 ppm KI+625 ppm $CuSO_4 \cdot 5H_2O$=>359 ppm CuI+239 ppm $I_2$+328 ppm $K_2SO_4$(+99 ppm $CuSO_4$ residual)+225 ppm $H_2O$ | Compounds |

(147 ppm K+478 ppm I)+(159 ppm Cu+80 ppm
  S+25 ppm H+361 ppm O)=>(120 ppm Cu+239
  ppm I)+239 ppm I$_2$+(147 ppm K+60 ppm
  S+121 ppm O)+(39 ppm Cu+20 ppm S+40 ppm
  O) Residual+(25 ppm H+200 ppm O)    Elemental Test Results and Discussion Chemical analysis using Inductively Coupled Plasma Mass Spectrometry (ICP-MS) was performed to determine total iodine/iodide concentration on fresh batches and at numerous time points from 0 to 24 months at Room Temperature (25° C.).

All samples tested were within the specification of 478 ppm (±20%) being consistent with the theoretical value calculated by stoichiometry. Note that the actual free Iodine concentration is computed as half the total Iodine/Iodide concentration as per the stoichiometric equation, a measurement assumption that was accepted by the FDA, yielding approximate free Iodine concentrations of about 245 ppm. Table 1 provides iodine concentration results for the solution at various time points.

TABLE 1

| Chemical Element | Theoretical concentration range | Measured concentration (ppm)-Batches stored at RT | | | | | | | | |
|---|---|---|---|---|---|---|---|---|---|---|
| | | 0 months | 3 months | 6 months | 12 months | 17 months | 21 months | 24 months | Mean | Standard Deviation |
| Total Iodine/Iodide | 373-564 ppm† [478 ppm (+/−20%)] | 504** | 471** | 502 | 493 | 523 | 466 | 475 | 492 | 22.5 |
| Iodine* | 186-282 ppm† [239 ppm (+/−20%)] | 252 | 235.5 | 251 | 246.5 | 261.5 | 233 | 237.5 | 245 | 10.4 |
| Iodide* | 186-282 ppm† [239 ppm (+/−20%)] | 252 | 235.5 | 251 | 246.5 | 261.5 | 233 | 237.5 | 245 | 10.4 |

*Based on 50/50 ratio per the theoretical stoichiometric equation.
**Average from batches LN319-015 and LN319-016.
†Specification range based on a 98% of mean recovery according to the analytical technique and +/−20% of experimental error applied to the theoretical concentration calculated by stoichiometry.

2. Biocompatibility and Toxicity Testing:

Biocompatibility testing was performed by an independent third party laboratory to confirm that the components and materials contained in the Clyra™ Solution are not adverse to human tissue.

Wound Irrigation/wound cleansers typically have to be rinsed out with saline. Wound Treatments (as opposed to wound irrigation or wound cleansers which typically have to be rinsed out with saline) are generally left in contact with the human body for from about 24 (twenty-four) hours to about 7 (seven) days depending on the wound management protocol in place and the required dressing changes. This corresponds to biocompatibility protocol categorization of >24 hours to 30 days for exposure to breached or compromised surfaces.

The Clyra™ Solution was tested for cytotoxicity (ISO 10993-5), sensitization (ISO 10993-10), irritation (ISO 10993-10) and material mediated pyrogenicity (ISO 10993-11) with the results summarized below. The results of the biocompatibility testing showed that there are no negative impacts from the materials that are used in the Clyra™ Solution.

A. Cytotoxicity Testing: The Cytotoxicity testing showed no cytotoxicity or cell lysis in any of the test wells. No pH shift was observed at 48 hours. The reagent control, negative control, and the positive control performed as anticipated. The individual reactivity grades were found to be a grade 2 (mild reactivity) and was found by the third party laboratory to meet the requirements of the test.

B. Guinea Pig Maximization Sensitization Testing: Maximization sensitization testing was conducted to evaluate the allergenic potential of sensitization capacity of the Clyra™ Solution. This test was used as a procedure for the screening of contact allergens in guinea pigs and extrapolating the results to humans, but it does not establish the actual risk of sensitization. The albino guinea pig model was chosen as the appropriate animal model for human allergic contact dermatitis. None of the animals in the study showed abnormal clinical signs during the test period. None of the negative control animals challenged with the control solution were observed with a sensitization response greater than "0." None of the test animals challenged with the test solution were observed with a sensitization response greater than "0." A negative sensitization incidence was interpreted for all test animals. Under the conditions of this protocol, the test solution was found by the third party laboratory to not elicit a sensitization response.

C. Irritation Testing: Primary skin irritation showed there were no significant dermal reactions observed at the test sites on the rabbits at the 60 minute, 24, 48 and 72 hour observation periods. In addition, none of the animals in the study showed abnormal clinical signs during the 60 minute, 24, 48 and 72 hour observation periods. The test was considered valid as the test solution remained in contact with skin for a minimum four hour exposure. The irritation response was negligible under the conditions of the protocol, and the test solution was found to be a negligible irritant.

D. Materials Mediated Rabbit Pyrogen Testing: The baseline temperatures for all the rabbits in this study were within 1° C. at the start of the test and no animals had a baseline temperature above 39.8° C. or less than 38.5° C. All of the validity criteria were met during the assay; therefore, the test was considered valid. During the 3 hour observation period, none of the rabbits administered with the test solution had a temperature rise >0.5° C. at the required observation time points. This response did not exceed the USP limit and meets the requirements for this test. Therefore these results indicate that the test solution was found by the third party laboratory to be non-pyrogenic.

3. Antimicrobial Effectiveness Testing:

Properties of the Clyra™ Solution were evaluated to determine the effectiveness of the product. The product was evaluated for antimicrobial activity in compliance with USP General Chapter 51 (<51>)—Antimicrobial Effectiveness Test and antimicrobial testing (ASTM E2315-03 discussed below). In addition, microbial testing USP General Chapters 61 and 62 (<61> and <62>) for non-sterile products was carried out as part of the overall stability testing (color, odor, appearance, pH) to ensure product remained within its specification and effective for its intended use over the proposed shelf life.

Antimicrobial effectiveness testing was performed by an independent third party lab, to demonstrate the Clyra™ Solution meets the criteria set forth by the USP General Chapter 51 on Antimicrobial Effectiveness Testing. The Antimicrobial Preservative Efficacy study tested the antimicrobial preservative efficacy of Clyra™ Solution against the following organisms: *Escherichia coli* (ATCC 8739), *Pseudomonas aeruginosa* (ATCC 9027), *Staphylococcus aureus* (ATCC 6538), *Candida albicans* (ATCC 10231), and *Aspergillus brasiliensis* (ATCC 16404). Both the initial testing and repeat testing after 11 months at 40 C show the device meets the USP criteria of acceptance for the Antimicrobial Effectiveness Test for Category 2.

The Clyra™ Solution was tested as a Category 2 product, defined in USP<51> as "topically used products made with aqueous bases or vehicles." The bacteria are grown on soy casein digest agar plates (SCDA) and harvested on the day of testing. The yeast is grown on sabouraud dextrose agar (SDEX) and harvested on the day of testing. The mold is grown on SDEX and harvested within a week before testing. All organisms are adjusted to approximately $1.0 \times 10^8$ colony-forming units (CFU)/mL by diluting in sterile saline. Individual test samples and a positive control are prepared for each organism.

At the 0-hour, the test samples and positive controls are individually inoculated with each organism to reach a concentration of $1.0 \times 10^5$-$1.0 \times 10^6$ CFU/mL. The volume of the inoculum used is from about 0.5% to about 1.0% of the volume of the product. The positive controls and samples are assayed immediately after inoculation to determine the challenge level and to provide confirmation that the samples were inoculated.

After the samples have been inoculated and the 0-hour assay has been performed, the samples are stored in a 20-25° C. incubator for the remainder of the test. At 48 hours, 7 days, 14 days and 28 days after inoculation, the samples are removed from the incubator and assayed for surviving organisms. At each of these time points, an aliquot is removed from the samples, diluted in an appropriate neutralizer and plated per the standard plate count procedure to determine the remaining concentration of organisms. The organisms recovered from each time point are compared to those seen in the 0-hour positive control. Changes in the concentrations of organisms are converted to Log reduction values for assessing the antimicrobial effectiveness of the samples, per the USP<51> criteria.

A kill time study measures the antimicrobial activity of the tested product over time. It can be used to measure the antimicrobial activity of a wide variety of products such as hand sanitizers, antiseptic wound gels, mouthwashes, and any other products that are expected to have microbiocidal properties. A Kill Time study is a generalized solution-based challenge study where the challenge organisms and time points are determined based on clinical relevance for the product being tested. It provides a quantitative kinetic kill model for the selected organisms and time points. This test complies with the ASTM Standard E2315-03, the Standard Guide for Assessment of Antimicrobial Activity Using a Time-Kill Procedure. The following organisms were tested at 10 minutes; 24 hours and 3 days. Table 3 below shows the Log reduction of microbial amounts over time, demonstrating effectiveness of the tested product.

TABLE 3

| Test Organism | $LOG_{10}$ Reduction 10 minutes | $LOG_{10}$ Reduction 24 hours | LOG 10 Reduction 3 days |
|---|---|---|---|
| *E faecium* | 2.49 | >5.13 | >5.13 |
| *Staphylococcus aureus* | 1.02 | >5.53 | >>5.53 |
| *K. pneumoniae* | >5.12 | >5.12 | >5.12 |
| *A. baumannii* | ~3.94 | ~5.35 | ~5.35 |
| *Pseudomonas aeruginosa* | >5.28 | >5.28 | >5.28 |
| *E. aerogenes* | 0.85 | >6.12 | >6.12 |
| *B. fragilis* | 2.94 | >4.87 | >4.87 |
| *Candida albicans* | 0.03 | >5.31 | >5.31 |
| *Candida tropicalis* | 0.18 | >5.35 | >5.35 |

The acceptance criteria for the Kill test was met as follows. Negative controls negative for growth. Positive controls positive for growth. Neutralization confirmed at ≥70%. Test results should demonstrate at least a 4-log reduction. Results show Clyra ™ Wound Irrigation Solution achieved >log 4 reduction in all organisms by 24 hours that is maintained at 3 days.

5. Stability Testing:

Stability data is based on the results of the chemical and physical stability, microbiological testing per USP<61>, and USP<62>, and Antimicrobial Effectiveness Testing (AET) per USP<51>. The measured physical/chemical characteristics of color, odor, appearance, and pH remained within specifications at 6 months Accelerated (40° C.) storage conditions. AET testing (USP<51>, Antimicrobial Effectiveness Testing) met USP acceptance for the Antimicrobial Effectiveness Test for Category 2. In addition, AET testing

TABLE 2

| | Initial Inoculum/g | | Log Reduction 14 Days | | Log Reduction 28 Days | |
|---|---|---|---|---|---|---|
| Test Organism | T0 | 11 mths 40 C. | T0 | 11 mths 40 C. | T0 | 11 mths 40 C. |
| *Escherichia. coli* | $3.1 \times 10^5$ | $2.0 \times 10^5$ | 4.5 | 4.3 | 4.5 | 4.3 |
| *Pseudomonas aeruginosa* | $3.5 \times 10^5$ | $5.3 \times 10^5$ | 4.5 | 4.3 | 4.5 | 4.3 |
| *Staphylococcus aureus* | $3.0 \times 10^5$ | $5.4 \times 10^5$ | 4.5 | 4.4 | 4.5 | 4.4 |
| *Candida albicans* | $2.3 \times 10^5$ | $5.1 \times 10^5$ | 4.3 | 4.1 | 4.3 | 4.1 |
| *Aspergillus brasiliensis* | $2.5 \times 10^5$ | $5.5 \times 10^5$ | 4.4 | 4.5 | 4.4 | 4.5 |

4. Kill Time Study:

An evaluation of products for anti-microbial activity was performed by an independent third party lab, against selected organisms at representative contact times. Products were evaluated in a liquid matrix. The test organisms and contact times were chosen by the sponsor. This is a quantitative test that allows the determination of the amount of organism reduction at pre-determined intervals. All test method acceptance criteria were met.

was submitted and met USP acceptance on the accelerated aging sample at 11 months at 40° C. confirming that the product is adequately preserved over its shelf life.

Microbial testing was also conducted at the initial time point and 11 months and 17 months at 40° C., and at 24 months at 25° C. All results were within specification with <10 CFU per gram for Total Aerobic Count, and Total Combined Molds and Yeasts tests. Also, both *Staphylococcus aureus* and *Pseudomonas aeruginosa* were seen to be absent indicating the product is adequately preserved over its expected shelf life, which is being proposed for 24 months.

Therefore based on the above studies, a shelf life of two (2) years has been assigned to the Clyra™ Solution, when stored unopened at ambient temperature, in dry conditions away from excessive heat, in accordance with the manufacturer's recommendations.

Figure 2:
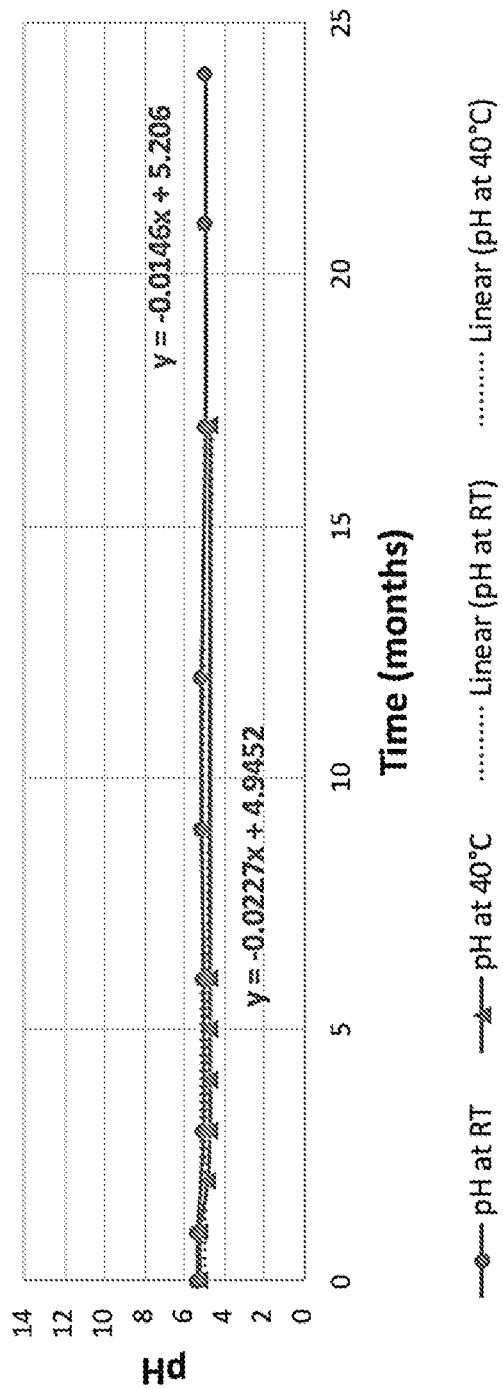
FIG. 2 shows the stability of pH levels of the test product over time under room temperature and accelerated conditions.

6. Clyra™ Solution pH Study:

A pH stability study was conducted to provide real time and accelerated stability data for the Clyra™ Solution. The pH was tested using the Bioscreen Test Method M576.R09 at both room temperature and 40 degrees C. (accelerated storage). FIG. 2 displays the average pH of the 6 batches tested, all of which were similarly within the pH range of about 4.5 to about 6.0 over the time period of the study under both room temperature and accelerated conditions.

7. Clyra™ Solution Efficacy Against Coronavirus SARS-CoV-2:

Level 3 lab testing at an independent third party laboratory demonstrated and confirmed that the Clyra™ Solution exhibits total eradication below detectable limits at 30 minutes (>6 log kill) against coronavirus, specifically the COVID-19 virus, thereby resulting in complete inactivation.

The invention claimed is:

1. A stable liquid antimicrobial disinfectant composition against coronavirus comprising:
   a. at least 95.0% of total weight of a carrier liquid;
   b. potassium iodide at a first effective concentration by weight;
   c. copper sulfate at a second effective concentration by weight;
   d. wherein a mixture of the first concentration of potassium iodide and the second concentration of copper sulfate generates an amount of free iodine in the composition of from about 100 ppm to about 330 ppm;
   e. wherein the carrier liquid does not include any metallopeptides, acidifying agents, buffers or surfactants; and
   f. wherein the composition maintains a pH of from about 4.0 to about 7.0 without discoloration or solid iodine precipitation for at least 6 months.

2. The composition of claim 1, where the composition includes from about 98% to about 99.9% by weight of the carrier liquid.

3. The composition of claim 1, wherein the carrier liquid comprises purified water.

4. The composition of claim 1, wherein the carrier liquid comprises water plus NaCl at a concentration of from about 0% to about 3%.

5. The composition of claim 1, wherein the carrier liquid comprises water plus NaCl at concentration of about 0.9%.

6. The composition of claim 1, where the copper sulfate is anhydrous copper sulfate or copper sulfate pentahydrate.

7. The composition of claim 1, wherein the first effective concentration is from about 0.025% to about 0.100% by weight, and either the copper sulfate is anhydrous copper sulfate and the second effective concentration is from about 0.016% to about 0.064% by weight, or the copper sulfate is copper sulfate pentahydrate and the second effective concentration is from about 0.025% to about 0.100% by weight.

8. The composition of claim 7, wherein the ratio of the first effective concentration to the second effective concentration is such that the ratio of the moles of potassium iodide to the moles of copper sulfate is from about 1.25 to about 1.75.

9. The composition of claim 1, wherein the first concentration is about 0.0625% by weight, and either the copper sulfate is anhydrous copper sulfate and the second effective concentration is about 0.040% by weight, or the copper sulfate is copper sulfate pentahydrate and the second effective concentration is about 0.0625% by weight.

10. The composition of claim 1, wherein an amount of free iodine generated in the composition is from about 200 to about 300 ppm.

11. The composition of claim 1, wherein an amount of free iodine generated in the composition is about 250 ppm.

12. The composition of claim 1, wherein the composition has an effective antimicrobial activity of at least three days.

13. The composition of claim 1, wherein the composition has a pH of from about 4.5 to about 6.0.

14. The composition of claim 1, wherein the composition maintains a pH of from about 4.5 to about 6.0 without discoloration or solid iodine precipitation for at least 24 months.

15. The composition of claim 1, wherein the composition does not include any pH adjusters.

16. The composition of claim 1, wherein the coronavirus is a human coronavirus.

17. The composition of claim 16, wherein the human coronavirus is HCoV-229E, HCoV-OC43, HCoV-NL63, HCoV-HKU1, SARS-CoV, MERS-CoV, or SARS-CoV-2, or a mutated strain thereof.

18. A stable liquid antimicrobial disinfectant composition against coronavirus comprising:
   a. a carrier liquid of from about 98% to about 99.9% of total weight of the composition and comprising water or saline;
   b. potassium iodide at a first effective concentration by weight;
   c. copper sulfate at a second effective concentration by weight, wherein the ratio of the first effective concentration to the second effective concentration is such that the ratio of the moles of potassium iodide to the moles of copper sulfate is from about 1.25 to about 1.75;
   d. wherein the mixture of the potassium iodide and copper sulfate generates an amount of free iodine in the composition of from about 100 ppm to about 330 ppm; and
   e. wherein the carrier liquid does not include any metallopeptides, acidifying agents, buffers or surfactants, and wherein the composition maintains a pH of from about 4.0 to about 7.0 without discoloration or solid iodine precipitation for at least 24 months.

19. The composition of claim 18, wherein the copper sulfate is either anhydrous copper sulfate or copper sulfate pentahydrate.

20. The composition of claim 18, wherein the coronavirus is a human coronavirus.

21. The composition of claim 20, wherein the human coronavirus is SARS-CoV-2 or a mutated strain of SARS-CoV-2.

22. A stable liquid antimicrobial disinfectant composition against coronavirus comprising:
   a. a carrier liquid of from about 98% to about 99.9% of total weight of the composition and comprising water or saline;
   b. potassium iodide at a concentration by weight of about 0.0625%;
   c. copper sulfate pentahydrate at a concentration by weight of about 0.0625%, wherein the mixture of the respective concentrations of potassium iodide and copper sulfate pentahydrate generates free iodine in solution at an amount of about 250 ppm;

d. wherein the composition maintains a pH of from about 4.0 to about 7.0 without discoloration or solid iodine precipitation for at least 24 months, and does not include any metallo-peptides, acidifying agents, buffers or surfactants.

23. The composition of claim 22, wherein the coronavirus is a human coronavirus.

24. The composition of claim 23, wherein the human coronavirus is SARS-CoV-2 or a mutated strain of SARS-CoV-2.